United States Patent

St. John et al.

[11] 3,799,406
[45] Mar. 26, 1974

[54] LIQUID INJECTION APPARATUS FOR SUCCESSIVE INJECTION OF EQUAL METERED VOLUMES

[75] Inventors: Peter A. St. John, Adelphi; Paul Priarone, Hyattsville, both of Md.

[73] Assignee: Baxter Laboratories, Inc., Morton Grove, Ill.

[22] Filed: Feb. 16, 1973

[21] Appl. No.: 332,798

[52] U.S. Cl. ............. 222/309, 128/218 A, 222/391
[51] Int. Cl. ............................................. G01f 11/06
[58] Field of Search ......... 222/309, 391; 128/218 A

[56] References Cited
UNITED STATES PATENTS

| 3,517,668 | 6/1970  | Brickson  | 222/309 X |
| 3,615,240 | 10/1971 | Sanz      | 222/309 X |
| 3,353,716 | 11/1967 | Fuchs     | 222/309 X |
| 3,664,551 | 5/1972  | Ferrari   | 222/309 X |
| 3,637,116 | 1/1972  | Rutherford| 222/309 X |

Primary Examiner—Robert B. Reeves
Assistant Examiner—Thomas E. Kocovsky
Attorney, Agent, or Firm—Herman L. Gordon

[57] ABSTRACT

An apparatus for operating a liquid dispensing syringe in successive discrete equal forward strokes to thereby dispense corresponding equal successive amounts of liquid. The apparatus consists of a support in which the syringe is clamped in alignment with an actuating rod. The end of the rod is connected to the syringe plunger. The rod is connected through a unidirectional ball and cone coupling assembly and a coupling bar to the piston rod of an air-operated cylinder assembly arranged parallel to the actuating rod. The coupling bar extends through a yoke on which is mounted a micrometer for accurately establishing the reset position of the coupling bar, and thereby setting the length of the dispensing stroke of the syringe plunger.

15 Claims, 5 Drawing Figures

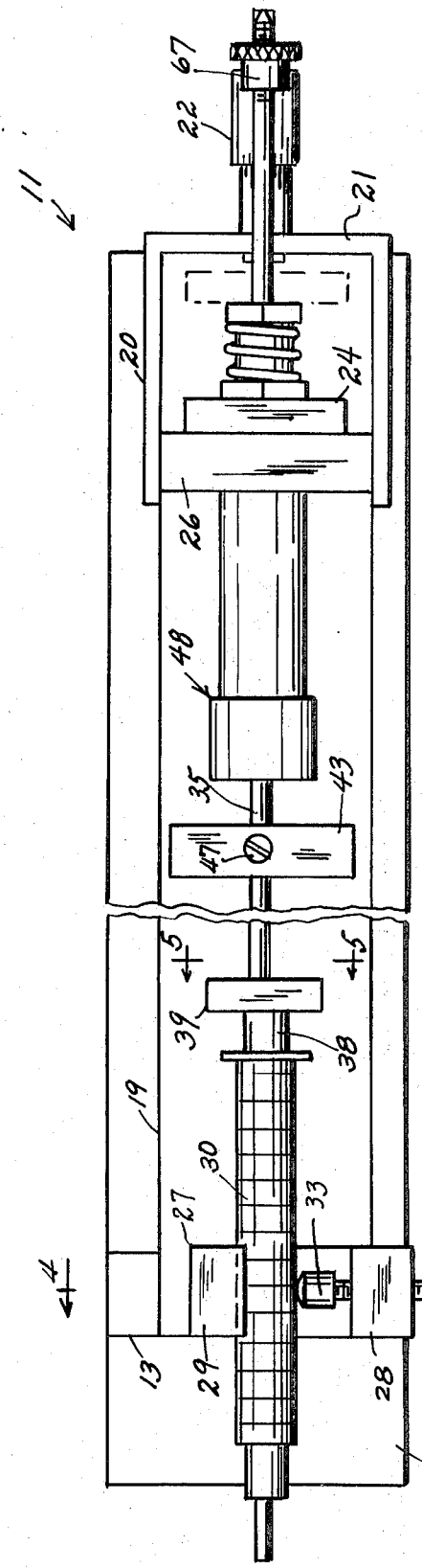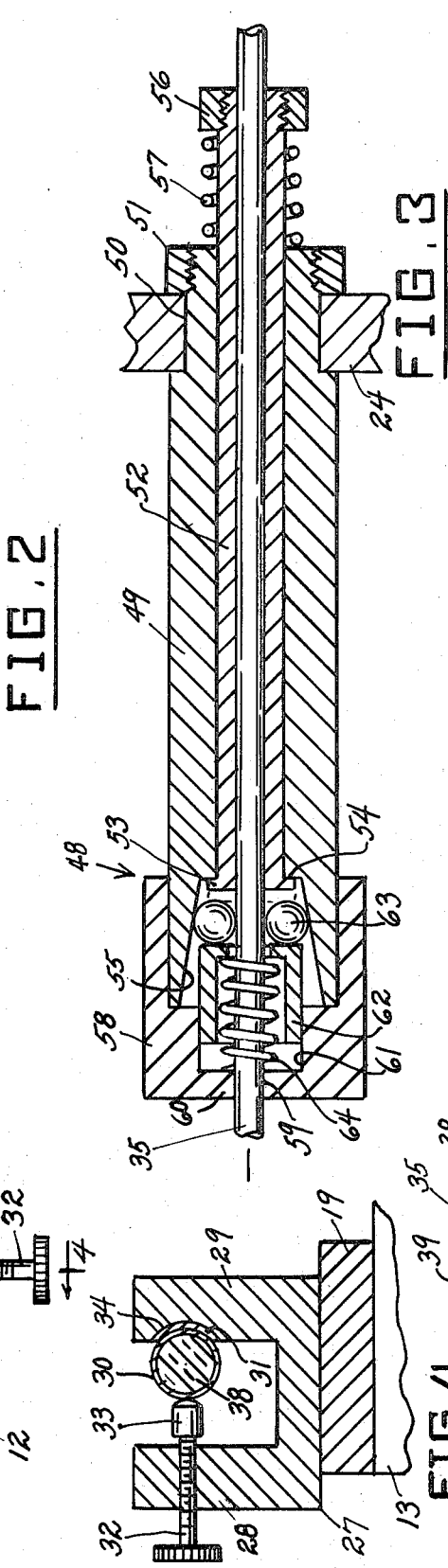

LIQUID INJECTION APPARATUS FOR SUCCESSIVE INJECTION OF EQUAL METERED VOLUMES

This invention relates to dispensing apparatus, and more particularly to an apparatus for operating a liquid dispensing syringe, or the like, in successive identical incremental strokes, to thereby dispense accurately similar successive volumes of liquid.

A main object of the invention is to provide a novel and improved apparatus for accurately dispensing a succession of precisely similar volumes from a dispensing syringe, or similar dispenser, the apparatus being relatively simple in construction, being easy to set up for use and to operate, and being readily and accurately adjustable to regulate the successively dispensed volumes of liquid.

A further object of the invention is to provide an improved apparatus for mechanically operating a syringe, or similar liquid dispensing device, in a series of accurately similar successive dispensing strokes derived from the longitudinal unidirectional movement of an actuating rod, wherein the actuating rod is driven by the reciprocation of the piston of a fluid pressure-operated cylinder assembly through unidirectional coupling means, the apparatus involving relatively few parts, being compact in size, being easy to adjust for a desired length of working stroke, being reliable in operation, and providing accurate liquid metering action.

A still further object of the invention is to provide an improved metering apparatus for dispensing liquid from a syringe, or similar dispenser, in accurately identical successive volumes, the apparatus employing a fluid pressure-operated cylinder having a reciprocatory piston and a unidirectional coupling arrangement for automatically drivingly coupling the piston to the syringe or dispenser only in one direction of movement of the piston, the apparatus having means for establishing the length of the ejection stroke with a high degree of precision and for maintaining its accuracy over long periods of operation without the necessity for readjustment.

Further objects and advantages of the invention will become apparent from the following description and claims, and from the accompanying drawings, wherein:

FIG. 2 is a top plan view of the apparatus, taken substantially on the line 2—2 of FIG. 1.

FIG. 3 is an enlarged longitudinal vertical cross-sectional view taken through the unidirectional rod-coupling assembly employed in the apparatus of FIGS. 1 and 2.

FIG. 4 is a fragmentary transverse vertical cross-sectional view taken substantially on the line 4—4 of FIG. 2.

FIG. 5 is a transverse vertical cross-sectional detail view taken substantially on the line 5—5 of FIG. 2.

Figure 1:
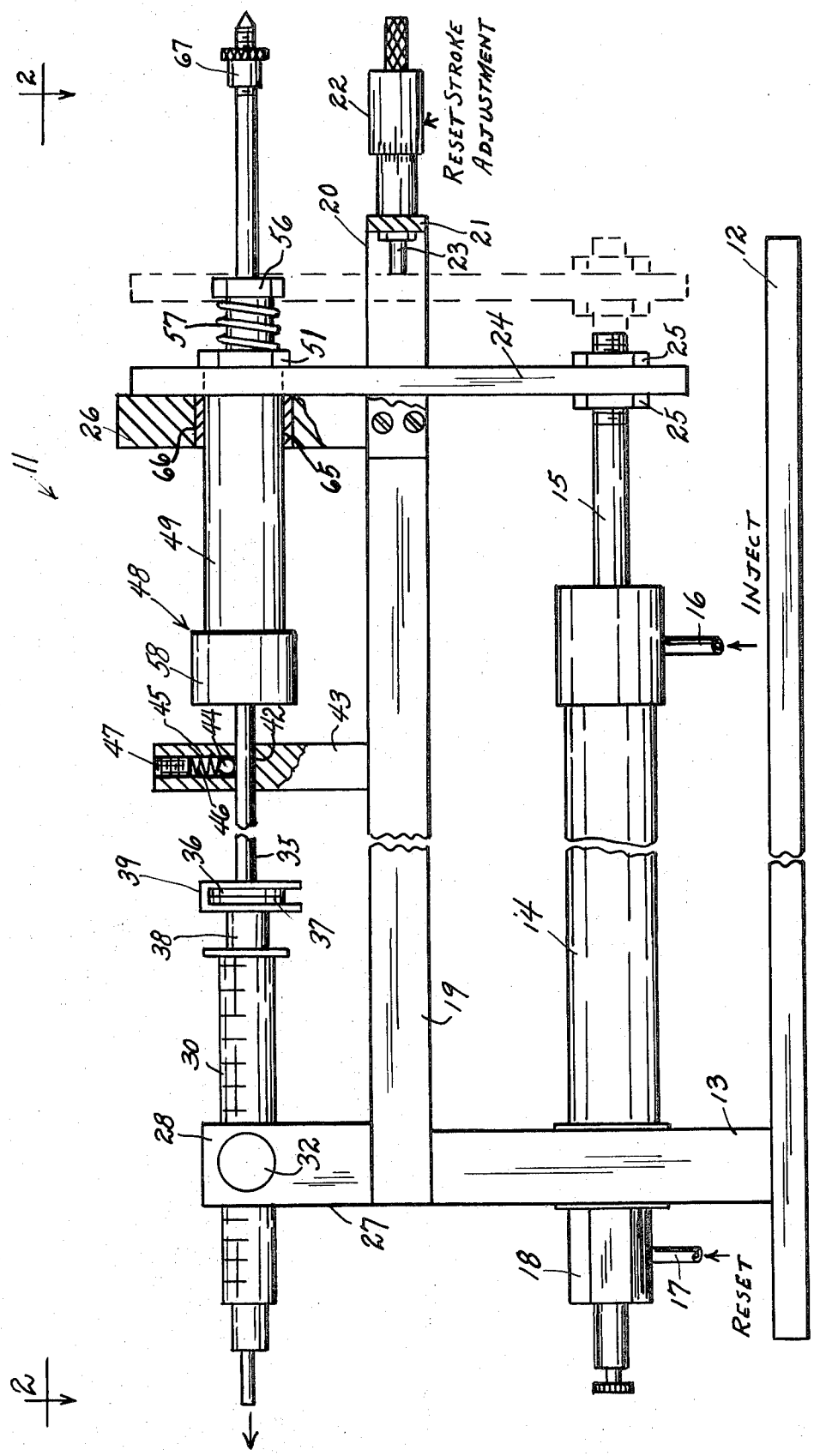
FIG. 1 is a front elevational view, partly in cross-section, of an improved mechanical syringe-operating apparatus constructed in accordance with the present invention.

Referring to the drawings, 11 generally designates an improved syringe-operating apparatus constructed in accordance with the present invention. The apparatus 11 comprises an elongated horizontal base plate 12 on which is rigidly mounted a transversely extending vertical block 13. Secured in block 13 and extending parallel to base plate 12 is a conventional fluid pressure-operated cylinder assembly 14 containing a reciprocatory piston having an externally projecting piston rod 15. The cylinder assembly is provided with respective fluid supply conduits 16 and 17 at its opposite ends and with conventional external valve means, not shown, for alternately admitting pressure fluid to one conduit while simultaneously venting the other, whereby to reciprocate the piston rod 15. An "eject" stroke is provided when pressure fluid is admitted to conduit 16, wherein rod 15 is moved leftwardly, as viewed in FIG. 1, whereas a "reset" stroke is provided when pressure fluid is admitted to conduit 17, causing rod 15 to move rightwardly. An adjustable needle valve 18 is provided between conduit 17 and the left end of the cylinder to control the speed of the rightward (reset) movement of rod 15.

Rigidly secured to the top edge portion of block 13 is an elongated horizontal block member 19 overlying and extending parallel to cylinder assembly 14. Secured to the right end portion of block member 19 is a horizontal U-shaped yoke member 20, and secured in the bight portion 21 of said yoke member is a micrometer 22 having the adjustable stop plunger 23 which faces the transverse right end edge of block member 19. A rigid coupling bar 24 extends vertically through the horizontal yoke member 20 and is perpendicularly secured to the end portion of piston rod 15, for example, by opposing clamping nuts 25, 25.

Rigidly secured on the right end portion of block 19 substantially flush with its right end edge is an upstanding, transversely extending bearing block 26, the upper portion of coupling bar 24 being engageable with block 26 to limit the leftward movement of piston rod 15. Rightward movement of said rod 15 is limited by the engagement of bar 24 with the adjustable stop plunger 23 of micrometer 22.

Rigidly secured transversely on the left end portion of block 19 is a U-shaped cradle block 27 having the upstanding spaced vertical arms 28 and 29. A syringe 30 is receivable between arms 28 and 29, the inner wall surface of arm 29 being conformably recessed to define a seat 34, which is provided with a suitable pad 31, to receive the syringe, the opposite arm 28 being provided with a clamping screw 32 having a resilient head portion 33 engageable against the syringe to clamp it against pad 31.

Designated at 35 is a push rod which is axially supported so as to be aligned with the clamped syringe 30. Rod 35 is provided with an end flange 36 which is mechanically connected to the end flange 37 of the plunger 38 of syringe 30 by a suitably slotted U-shaped clip 39. Thus, the arms of spring clip 39 are formed with respective slots 40, 41 to receive rod 35 and plunger 38 and detachably clamp the flanges 36 and 37 in abutment with each other, as shown in FIGS. 1 and 5.

Rod 35 extends slidably through a horizontal bore 42 formed in a transversely extending block 43 rigidly secured on elongated block member 19. A friction ball 44 is provided in a vertical bore 45 formed in block 43 above and communicating with bore 42, the ball 44 being subjected to an adjustable friction force by a coiled spring 46 and an adjustable screw 47 threadedly engaged in bore 45. Screw 47 may be adjusted to provide sufficient frictional force on rod 35 to hold it stationary in block 43 unless a positive driving axial thrust is exerted on the rod.

Rod 35 is drivingly coupled to bar 24 by a unidirectional coupling assembly designated generally at 48.

The unidirectional coupling assembly 48 comprises a generally cylindrical tubular main body 49 which has a reduced end portion 50 received in an aperture in bar 24 and clampingly secured thereto by a fastening nut 51. An inner sleeve member 52 is slidably received in the bore of tubular member 49. At its left end, as viewed in FIG. 3, sleeve member 52 is provided with a flange 53 which is normally urged against an annular shoulder 54 defined at the inner end of a frusto-conical cavity 55 formed in the left end of member 49. At its right end a nut 56 is threadedly engaged on sleeve member 52, and a coiled spring 57 surrounds member 52 and bears between nut 56 and the right end of body 49.

A cylindrical cap member 58 is secured on the left end portion of body 49, as viewed in FIG. 3. The push rod 35 extends slidably through sleeve member 52 and a central aperture 59 in the circular outer main wall 60 of cap member 58. Main wall 60 is formed with a central cylindrical recess 61 which slidably supports a cup-like annular housing 62 surrounding push rod 35 and urged against a plurality of clutch balls 63, provided between the conical wall of cavity 55 and the push rod, by a coiled spring 64 surrounding rod 35 and bearing at its right end in cup member 62 and at its left end on wall 60.

The tubular body 49 extends slidably through a bearing sleeve 65 mounted in a bore 66 formed in block 26. As previously mentioned, leftward movement of bar 24 is limited by its engagement with said block 26.

When bar 24 moves leftwardly, as viewed in FIG. 3, the balls 63 are wedged between cavity 55 and rod 35, forming a driving connection and causing rod 35 to be moved leftwardly through a discharge stroke from the dotted view position of bar 24 in FIG. 4 to the full-line position thereof wherein bar 24 abuts block 26. This movement is generated by introducing pressure fluid into the right end of cylinder 14 through conduit 16. When the movement of piston rod 15 is reversed, namely, when pressure fluid is admitted into the left end of cylinder 14 through conduit 17 and needle valve 18, bar 24 moves body 49 rightwardly, and the frictional force exerted by ball 44 on rod 35 is sufficient to hold rod 35 stationary while bar 24 moves to its rightward limiting position abutting micrometer plunger 23, shown in dotted view in FIG. 1.

Thus, in operation, rod 35 is moved leftwardly in successive increments produced by successive reciprocations of piston rod 15, each leftward stroke discharging a precisely measured amount of liquid from the syringe 30.

As above mentioned, cylinder 14 is operated by suitable conventional external valve means.

When the desired number of dosage quantities has been discharged from the syringe, it may be removed from its support cradle 13 by detaching spring clip 39 and releasing clamping screw 32. The rod 35 may be retracted rightwardly to return it to a desired strating position for a new series of discharge strokes by manually pulling it rightwardly while simultaneously manually exerting leftward pushing force on nut member 56 sufficient to cause flange 53 to push balls 63 leftwardly sufficiently to slightly disengage them from the internal conical clutch surface of cavity 55.

A stop nut 67 is provided on the right end portion of rod 35 to limit leftward movement of the rod at the end of its intended travel.

The provision of the adjustable needle valve 18 enables the fluid pressure cylinder assembly 14 to be set for a relatively slow reset stroke, thereby insuring that the clutch balls 63 will not retain their grip on the push rod 35 and that the frictional gripping action of the spring-pressed ball 44 will be effective to hold the push rod stationary while the driving member 24 and the unidirectional coupling assembly 48 move through the reset stroke, namely, rightwardly as viewed in FIG. 1 from the full-line position to the dotted view position of member 24.

Although a fluid pressure cylinder assembly is illustrated and described herein as the reciprocatory driving means, other types of reciprocatory driving means may be employed, such as electromagnetic, or the like, within the spirit of the present invention.

While a specific embodiment of an apparatus for operating a liquid dispensing syringe has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An apparatus for operating a liquid dispensing syringe in successive equal ejection strokes to thereby dispense corresponding equal successive volumes of liquid comprising a support including an elongated block member, means on the support defining a seat to receive a syringe parallel to said block member, means to hold the syringe in said seat, an actuating rod member axially aligned with said seat, means movably supporting said actuating rod member for reciprocating movement in the same axial direction as said seat, means to connect said actuating rod member to the plunger of a syringe mounted in said seat, a reciprocatory driving means arranged parallel to said block member, a driving bar member extending transverse to said block member and being rigidly connected to said reciprocatory driving means, means including a unidirectional coupling assembly drivingly connecting said driving bar member to said actuating rod member only for incremental unidirectional liquid ejection movement of said actuating rod member, and spaced stop means carried by said elongated block member and being engageable by and limiting ejection and reset movement of said driving bar member.

2. The apparatus of claim 1, and wherein said reciprocatory driving means comprises a fluid pressure cylinder on said support having a reciprocatory piston rod, said driving bar member being secured to said piston rod.

3. The apparatus of claim 1, and wherein said reciprocatory driving means comprises a fluid pressure cylinder on said support extending substantially parallel to said rod member and having a reciprocatory piston rod, said driving bar member being secured to said piston rod.

4. The apparatus of claim 1, and wherein said unidirectional coupling assembly comprises a tubular body secured to said driving bar member and coaxially receiving said rod member, said tubular body having a conical recess flaring in the direction of ejection movement, a plurality of clutch balls in said recess engaged between said rod member and the wall of the conical recess, and spring means normally urging the balls toward wedging engagement with said rod member and said wall.

5. The apparatus of claim 4, and an inner sleeve element slidably and coaxially mounted in said tubular body and being axially movable against said clutch balls to at times uncouple the rod member from the tubular body to allow the rod member to be retracted relative to the driving member.

6. The apparatus of claim 4, and a bearing block on said support slidably receiving said tubular body.

7. The apparatus of claim 4, and wherein the end of the elongated block member is provided with a yoke member through which said driving bar member extends, and said stop means includes an adjustable abutment element mounted on said yoke member and being engageable by said driving bar member in its reset movement.

8. The apparatus of claim 7, and wherein said adjustable abutment element comprises the movable plunger element of a micrometer mounted on said yoke member.

9. The apparatus of claim 1, and means secured on said elongated block member and engaging said actuating rod member with sufficient frictional force to hold it stationary during said reset movement.

10. The apparatus of claim 9, and wherein said means engaging the actuating rod member comprises a projection on said elongated block member slidably receiving said rod member and a friction element in said projection engaging said rod member.

11. The apparatus of claim 10, and wherein said projection is formed with a first bore receiving said rod member and with a second bore perpendicular to said first bore, and wherein said friction element comprises a ball in said second bore and spring means biasing said ball into contact with said rod member.

12. The apparatus of claim 11, and means to adjust the force exerted by said spring means.

13. The apparatus of claim 12, and means to retard the reset movement of said reciprocatory driving means sufficiently to maintain the rod member stationary under said force during said reset movement.

14. The apparatus of claim 13, and wherein said reciprocatory driving means comprises a fluid pressure cylinder having respective ejection and reset fluid pressure inlet conduits connected to its opposite end portions, and wherein said retarding means comprises a restriction in the reset fluid pressure inlet conduit.

15. The apparatus of claim 14, and wherein said restriction comprises an adjustable valve.

* * * * *